United States Patent [19]
Gillick et al.

[11] Patent Number: 5,446,481
[45] Date of Patent: Aug. 29, 1995

[54] MULTIDIMENSIONAL HYBRID MOUSE FOR COMPUTERS

[75] Inventors: William G. Gillick, San Jose; Ronald A. Rosenberg, Sunnyvale, both of Calif.

[73] Assignee: Mouse Systems Corporation, Fremont, Calif.

[21] Appl. No.: 772,395

[22] Filed: Oct. 11, 1991

[51] Int. Cl.⁶ .................................................. G09G 3/02
[52] U.S. Cl. ................................. 345/163; 345/157; 74/471 X
[58] Field of Search ............... 340/710, 706, 709; 74/471 X; 345/163, 164, 157, 167

[56] References Cited

U.S. PATENT DOCUMENTS

| | | | |
|---|---|---|---|
| 4,520,240 | 5/1985 | Swindler | 340/709 |
| 4,562,347 | 12/1985 | Hovey et al. | 340/710 |
| 4,641,123 | 2/1987 | Whitehead | 74/471 X |
| 4,839,838 | 6/1989 | LaBiche et al. | 340/710 |
| 4,896,554 | 1/1990 | Culver | 340/710 |
| 4,933,670 | 6/1990 | Wislocki | |
| 4,939,508 | 7/1990 | Lawrence et al. | 340/710 |
| 4,988,981 | 1/1991 | Zimmerman et al. | 340/705 |
| 5,063,289 | 11/1991 | Jasinski et al. | 74/471 X |
| 5,095,302 | 3/1992 | McLean et al. | 340/710 |
| 5,095,303 | 3/1992 | Clark et al. | 340/710 |

*Primary Examiner*—Ulysses Weldon
*Assistant Examiner*—Matthew Luu
*Attorney, Agent, or Firm*—Schneck & McHugh

[57] ABSTRACT

A hybrid mouse combining the usual x and y motion signals usually found in mice together with additional degrees of freedom, particularly a z-axis signal. The z-axis signal is generated by a roller whose turning motion is sensed by a shaft angle encoder, including a light chopper. Additional degrees of freedom may be provided by tilting the roller left and right to actuate switches. Actuation of each switch, together with pulse counts from the roller may be used to indicate pitch and roll. A yaw motion signal may be provided by use of dual position detectors. In another embodiment, pitch and roll may be indicated by a trackball mounted on the mouse housing with or without the z-axis roller.

5 Claims, 5 Drawing Sheets

MULTIDIMENSIONAL HYBRID MOUSE FOR COMPUTERS

DESCRIPTION

1. Technical Field

The invention relates to pointing devices for computers such as mice and trackballs.

2. Background Art

A mouse is a control device, used with a computer monitor, in which a transducer converts translational motion of a movable, hand-held device into a position signal, most frequently used for controlling a cursor. Movement of the device is converted to movement of the cursor. Motion is sensed in x and y directions, and sometimes rotation in the x-y plane known as yaw motion is also sensed, as the housing moves over a surface known as a pad. Analogous motion of the cursor in x and y directions takes place as the mouse delivers its position signals to an associated computer. Rotational motion is useful in applications software, such as drawing or computer aided design (CAD) programs. An example of a mouse with optical sensors for detecting motion is U.S. Pat. No. 4,920,260, by K. Victor and C. Goy, assigned to the assignee of the present invention. In this patent the mouse moves over a pad having a repetitive pattern of optical markings which are illuminated by a beam of light. Line crossings are counted as a measure of motion of the device. U.S. Pat. No. 4,364,035 to S. Kirsch shows a similar device, with a different detection scheme. One of the features of the Kirsch mouse, described with reference to FIG. 6 of the '035 patent, is that it can detect rotation, as well as translation. See U.S. Pat. No. 4,797,544 to J. Montgomery which describes circuitry for tracking two optical detectors reporting two position locations X1, Y1 and X2, Y2 in order to compute rotation. See also U.S. Pat. No. 4,984,287 to Massoudi, assigned to the assignee of the present invention. Although the two detectors described in the latter two patents exist in a scanner, they could also exist in a mouse, as in the '035 Kirsch patent, hereafter collectively referred to as a "dual detector mouse".

A trackball is another cursor control device. A trackball converts rotational motion of a ball into x,y quadrature signals, compatible with the x,y signals produced by a mouse. The ball is suspended in a fixed position, as shown in U.S. Pat. No. 4,933,670. The latter patent recognizes that more than three degrees of freedom or dimensions may be desirable in a trackball and incorporates control buttons, annular rings about the ball, and a partial keyboard for additional commands.

The need for more than three degrees of freedom arises in new software applications, particularly graphics. For example, besides the usual x and y translation of images, rotation of images with yaw, roll and pitch is useful for examining the shape of an object. Moreover, a z degree of freedom is useful for pointing out depth of an object or for moving in an orthogonal direction in a spreadsheet to access depthwise layers of a three dimensional data space. This leads to 6 dimensions or degrees of freedom, even though roll, pitch and yaw are not necessarily independent of x, y and z. Rather roll, pitch and yaw can be another way of expressing motion in the same space as x, y and z.

Because mice and trackballs are hand held devices, it would seem difficult to generate information on moving in six coordinate directions without something like a keyboard where, with a fair amount of training, human fingers can manipulate keys to supply a variety of computer input. An object of the invention was to find a hand held cursor control device capable of handling multiple degrees of freedom, yet which could be intuitively manipulated by a user without much training.

SUMMARY OF THE INVENTION

The above object has been met by combining a dual detector mouse with a roller which adds at least one additional degree of freedom and, in alternative embodiments, adds two or more additional degrees of freedom. The roller is mounted on a mouse housing so that a user can manipulate the roller while also able to actuate buttons on the mouse and control mouse movement.

The roller provides a z degree of freedom, pointing to motion perpendicular to the x-y plane, i.e. usually perpendicular to the plane displayed on the monitor. For example, in a spreadsheet, this would be useful for showing spreadsheet layers above and below the one currently displayed in a three-dimensional spreadsheet. Another use could be in the situation where a three-dimensional object is shown in the manner such that the x-y plane is at an angle to the screen, thereby revealing a z-axis. The roller could be used to point along the z-axis, while the mouse could be used to point in the x-y plane.

The roller is supported within a mouse housing with the roller projecting through the housing. Turning of the roller by a human finger indicates the extent of z-axis position. Rotation of the roller is read by a shaft angle encoder which converts rotational motion of the roller into a number of pulse counts, indicating motion along the z-axis. The roller is mounted in a suspension which allows tilting left and right. By tilting the roller either left or right, additional degrees of freedom may be indicated. For example, if the roller is tilted to the left, closing a connected switch, and then the roller is turned, the roller generated pulses could signify pitch. If the roller is tilted in the opposite direction and then turned, the pulse count could indicate roll.

In another embodiment, rather than tilting the roller left and right in order to indicate pitch and roll, a trackball may be combined with a mouse housing. A trackball has two degrees of freedom in addition to those provided by the mouse. A further degree of freedom could be provided by a roller near the trackball.

With six degrees of freedom, a computer program could display x, y and z coordinates, known as Cartesian coordinates, and at the same time also employ roll, pitch and yaw coordinates, in an angular coordinate system. Both coordinate systems could share the same origin and would be useful in computer programs employing graphics, where it is desirable to rotate objects using angular coordinates, as well as to draw and revise objects using normal Cartesian coordinates.

BEST MODE FOR CARRYING OUT THE INVENTION

Figure 1:
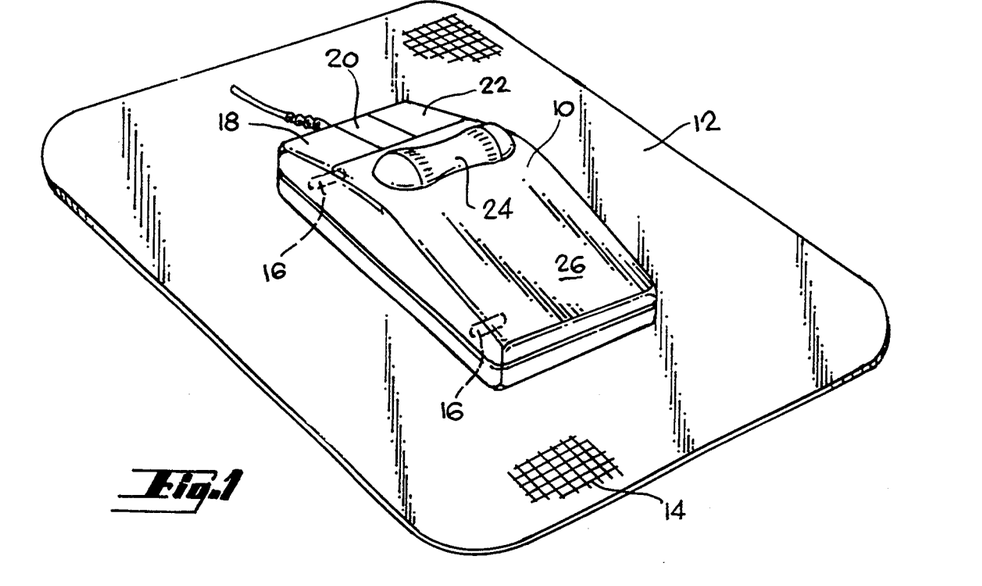
FIG. 1 is a perspective view of the hybrid mouse device of the present invention.

With reference to FIG. 1, a dual detector mouse 10 is shown. Although this type of mouse is an optical mouse which employs a pad surface 12 with a pattern of grid lines 14, other mice, including non-optical mice, could be used as long as two detectors exist for this preferred embodiment. If two detectors do not exist, but only one detector exists as in most conventional mice, the present invention is still applicable, but with one less degree of freedom.

Mouse 10 is moved with reference to the pad and counts line crossings or otherwise determines motion relative to the pad or supporting surface. The mouse employs optical detectors 16, indicated by dashed lines to measure line crossings. The mouse slides over the pad surface as it is moved by a human hand. Line crossing information is converted to x and y motion signals. Using two optical detectors, it is possible to determine yaw motion when the x and y motion detectors report motion in opposite directions. The mouse has control buttons 18, 20 and 22 which serve signaling functions. A typical software program might interpret a button signal to be equivalent to a carriage return or an escape character, although any assignment may be made.

Mouse 10 also includes a finger-operated roller 24. The size of the mouse device is comparable to a cigarette pack and so the control buttons 18, 20 and 22 would be within finger reach of the roller 24 without much movement of the position of the palm of the hand on the rear portion 26 of the mouse housing. The roller generates a z direction motion signal which would be perpendicular to the x-y plane, coinciding with pad surface 12. Recalling that the mouse provides x, y and yaw motion signals, the additional z direction signal gives the mouse a three-dimensional pointing capability, plus yaw motion.

Figure 2:
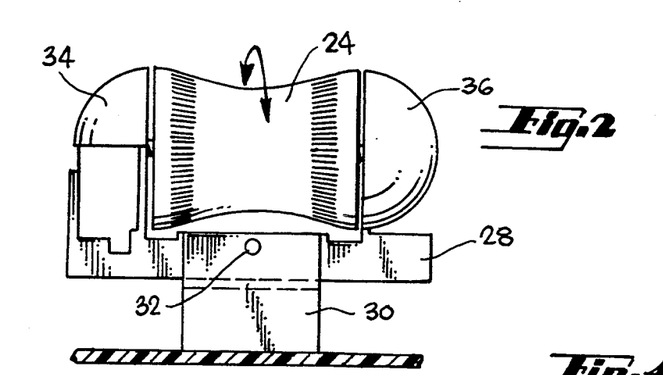
FIG. 2 is a rear view of the suspension mechanism for the roller employed in the apparatus of FIG. 1.

With reference to FIG. 2, roller 24 is shown to be supported by an arm 28 connected to upright beam 30 at pivot 32. Upright beam 30 is U-shaped, allowing arm 28 to pass through the central portion of the U. Arm 28 supports upright shrouds 34 and 36 which enclose support bearings for the axis of roller 24 so that the roller can turn when rotated by a finger.

Figure 3:
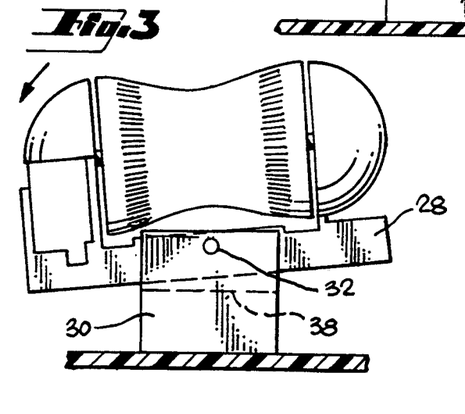
FIGS. 3 and 4 show tilting motion of the roller of FIG. 2.
Figure 4:
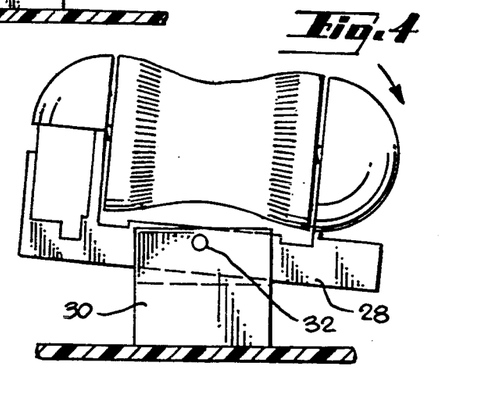

FIGS. 3 and 4 show rocking motion of arm 28 about pivot 32. The amount of rocking is limited by a stop member 38 mounted within the open portion of the U-shaped upright beam 30.

Figure 5:
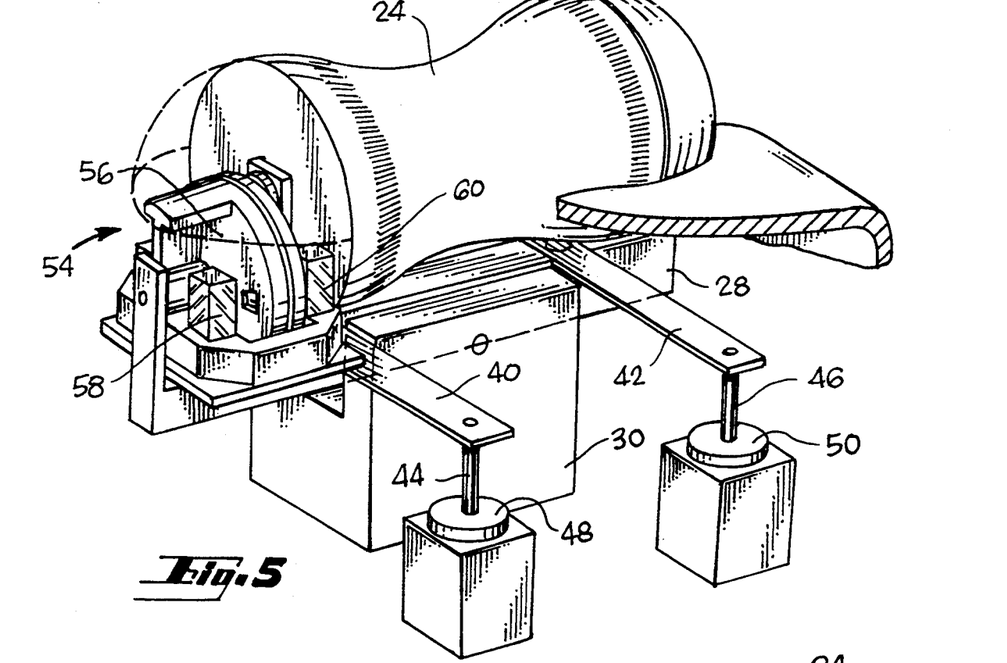
FIG. 5 is a perspective view of the roller and support, as well as shaft angle encoding apparatus, all employed in the hybrid mouse of FIG. 1.

Support arm 28 carries a pair of flexible fingers 40 and 42, shown in FIG. 5. One end of the fingers is mounted to arm 28, while a distal end, cantilevered from arm 28, carries contact rods 44 and 46 spaced slightly above normally open momentary microswitches 48 and 50, respectively. The contact rods reside slightly above the movable, disk-like microswitch actuators and are not depressing the microswitches when roller 24 is in a level position, which is its normal state. However, if the roller is tilted to either side, as shown in FIG. 3 or FIG. 4, one of the flexible fingers 40 or 42 bends slightly as pressure is exerted upon it bringing the connected contact rod to bear against a respective microswitch, thereby closing the switch. Upon release of pressure on the roller the flexible finger and the microswitch restoring force will bring the roller back to a neutral horizontal position and a microswitch will revert to an open position. Closing of a microswitch is indicative of signaling motion associated with another degree of freedom. The two directions which have been assigned to tilting left and right, as shown in FIGS. 3 and 4, is pitch and roll. The extent of motion associated with the new degree of freedom depends upon the turning of roller 24 when the roller is in the selected tilted position. In other words, signaling pitch or roll requires both tilting and turning of the roller. Upright beam 30, as well as microswitches 48 and 50 are mounted on the floor of the mouse housing or on a circuit board 52, shown in FIG. 8.

Returning to FIG. 5, shaft angle encoder 54 is carried by arm 28 and serves to convert rotation of roller 24 into an electrical signal which is indicative of the extent of z axis motion or motion associated with the degrees of freedom defined by the two tilted positions of the roller 24. The shaft angle encoder includes a non-rotating semicircular mask 56 with apertures defined therein, as well as a first optical transmitter 60 and a detector 58. A second optical transmitter and detector are mounted on a radially opposite side of the mask.

Figure 6:
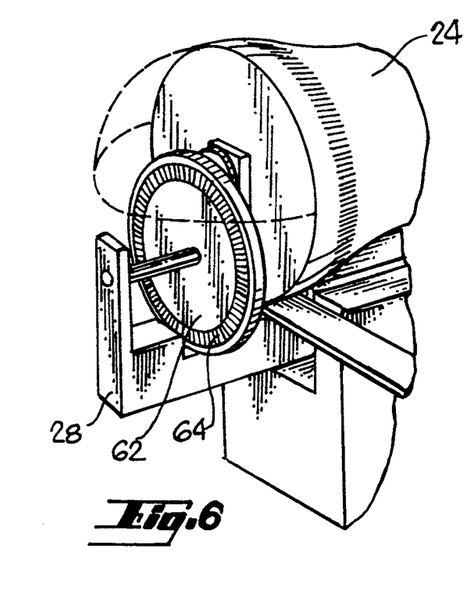
FIGS. 6, 7, 7A, 8, 9 and 10 illustrate details of the shaft angle encoding apparatus illustrated in FIG. 5.

Immediately behind mask 56 is a wheel 62, shown in FIG. 6. This wheel carries a number of radially equally spaced slits 64 so that wheel 62 can act as a light chopper. If one slit exists within each two degree circumferential angle the wheel will have forty five slits and a resolution of eight degrees, assuming no frictional slippage of the roller. An optical pulse in each four degree slit can be resolved into 4 counts, thereby creating a signal resolution of two degrees.

Figure 7:
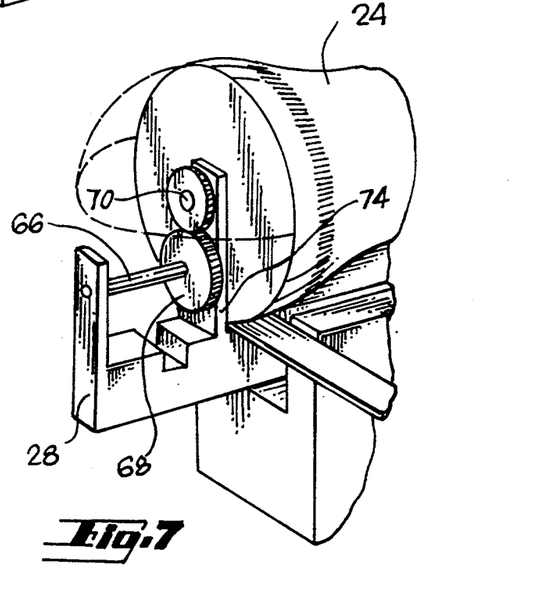
Figures 7A, 13:
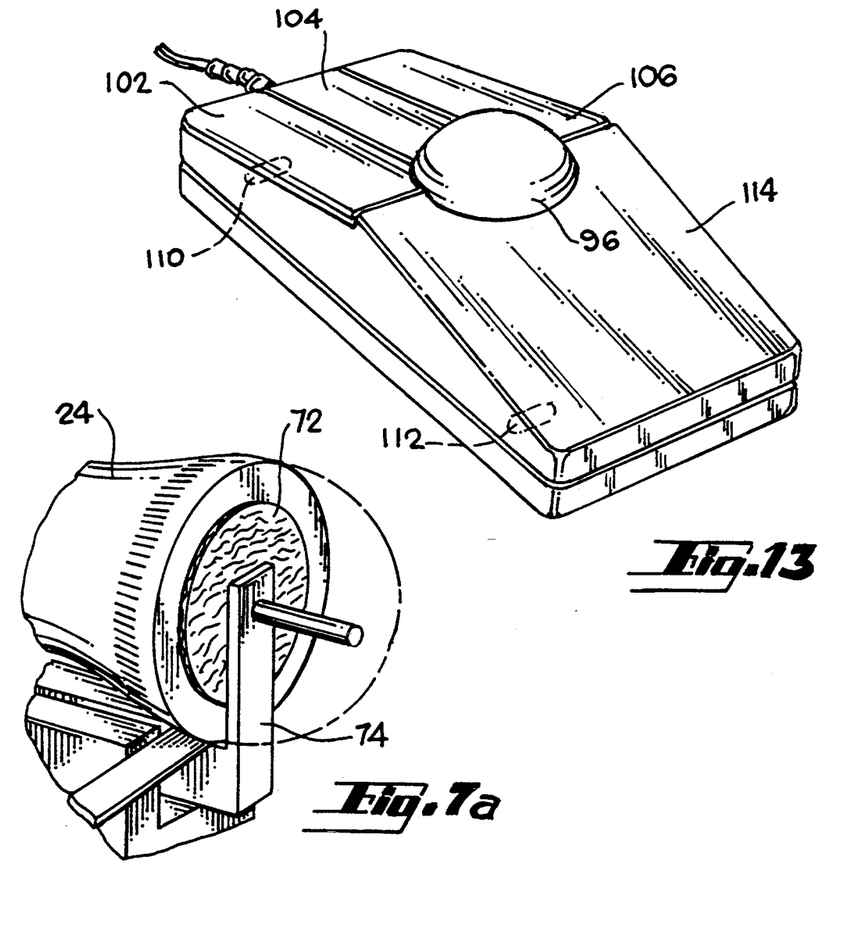
FIG. 13 is a third alternative embodiment of the hybrid mouse of FIG. 1.

To assure tight mechanical coupling between the roller and wheel 62, the axis of roller 24 is locked to the axis of wheel 62 by means of gears as shown in FIG. 7. Arm 28 carries a shaft 66 which mounts a first gear 68. This first gear has teeth which mesh with a second gear 70 mounted at the end of the axial shaft of roller 24. In FIG. 7a, at the opposite end of roller 24, a friction disk 72, adhered to an end of roller 24, made of rayon fibers or the like, rubs against an upright roller support 74 attached to arm 28 to provide rotational resistance and prevent free-wheeling in the gears 68 and 70.

Figure 8:
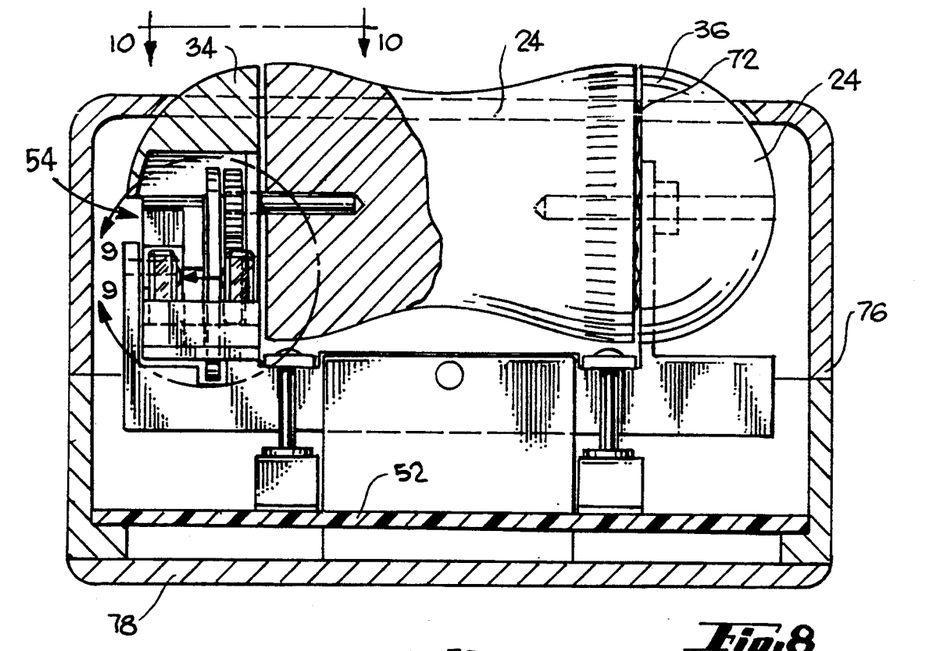

In FIG. 8, mouse housing 76 is seen to allow the top portion of roller 24 to project outwardly through the housing with slight clearance allowing rotation. The roller operational mechanisms are supported near board 52 which resides above the floor 78 of the mouse housing. The shaft angle encoder 54 is covered by the shroud 34 which also projects through the top of the housing 76. Shroud 36 is on the opposite side of roller 24.

Figure 9:
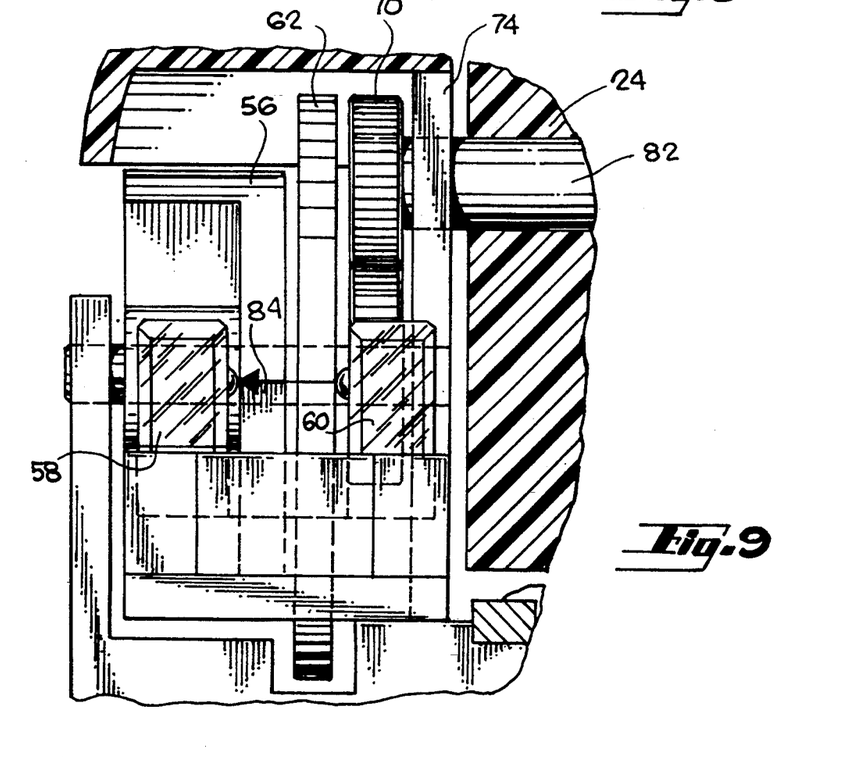

In FIG. 9, gear 70 is seen to be supported on roller shaft 82 extending into the body of roller 24. Second arm 74 supports the roller shaft 82. Optical transmitter 60 may be seen directing a beam of light 84 through chopper wheel 62 and mask 56 to impinge upon detector 58.

Figure 10:
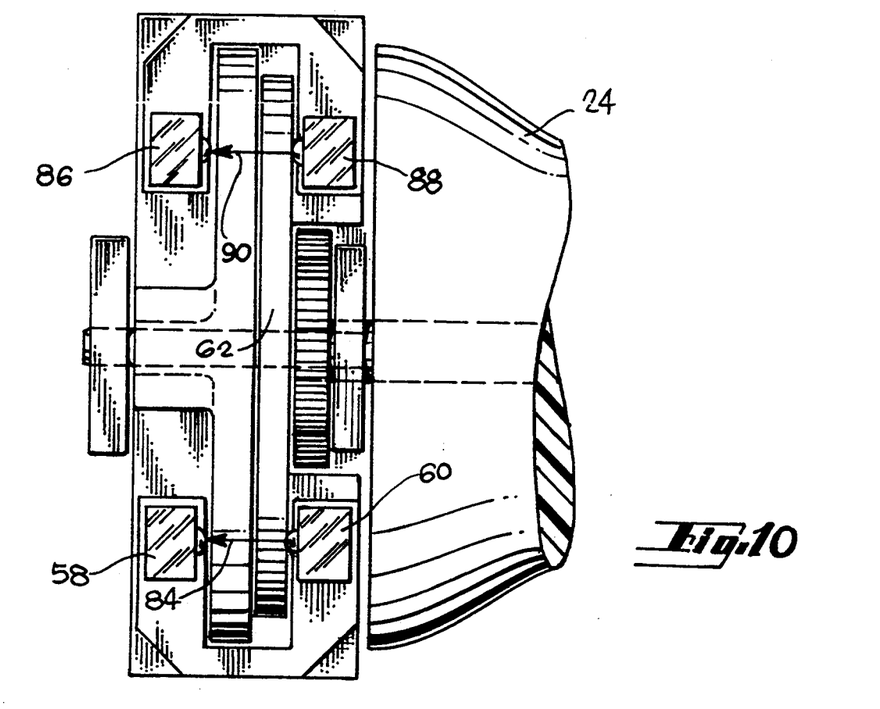

In FIG. 10, both transmitters may be seen. First transmitter 60 directs light beam 84 to detector 58. On a opposite side of chopper wheel 62 a transmitter 88 directs light to detector 86. Second beam 90 is the counterpart of beam 84. The two signals from the detectors are processed with a quadrature method to determine the proper pulse count. Quadrature pulse counters are well known. An arbitrary number of chopped light pulses may be assigned to an angle, although a one to one relationship may be preserved. In the latter case, forty-five pulses would represent ninety degrees of rotation, assuming one slit every two degrees. For z direction motion, an arbitrary number of pulses may be assigned to a unit of distance. For example, forty-five pulses might be equivalent of one centimeter of motion of the mouse if the mouse were moving in the z direction.

Figure 11:
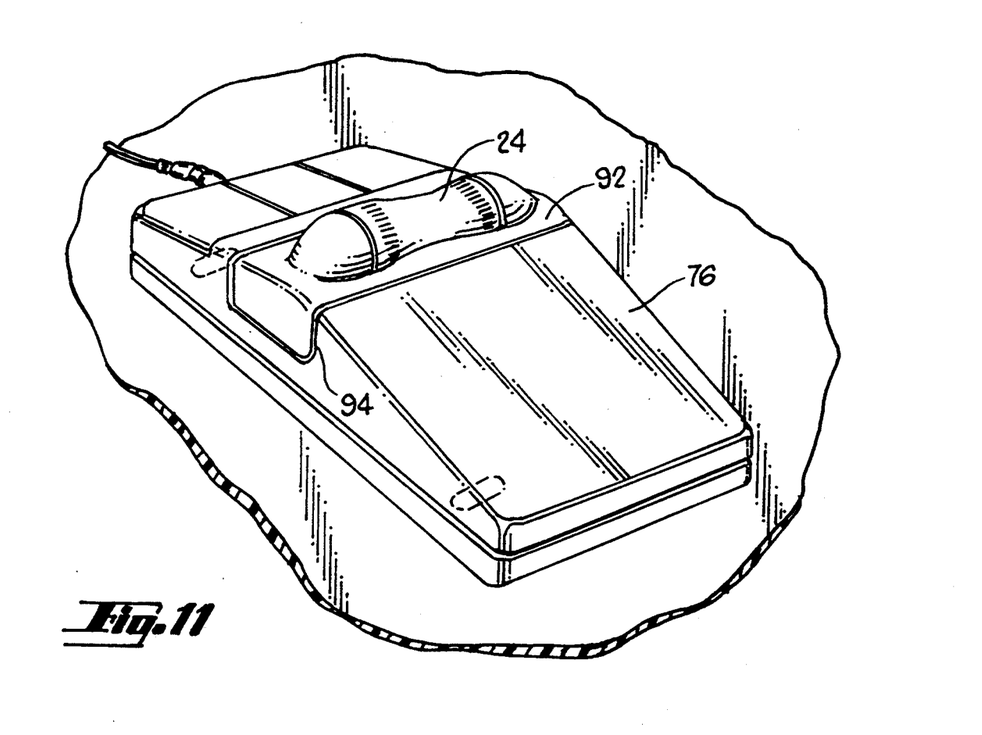
FIG. 11 is a perspective view of an alternative embodiment of the hybrid mouse of FIG. 1.

In FIG. 11, the roller 24 is seen to be carried by a saddle 92 which is supported for tilting inside of the mouse housing 76. Once again, the tilting will serve to actuate a different degree of freedom than a roller turning by itself in the same way as the embodiment described with respect to FIG. 5. Saddle 92 is received in an indentation 94 of housing 76. This embodiment is quite similar to the embodiment of FIG. 1 except that there is greater dust and moisture protection on the top surface of the housing.

Figure 12:
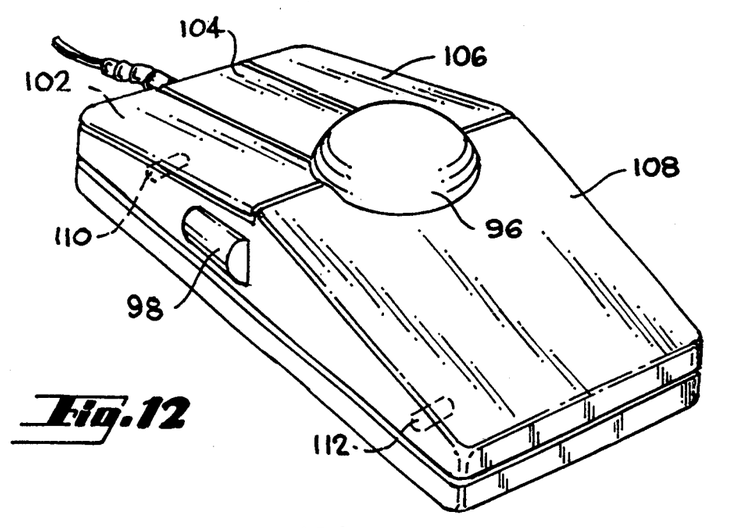
FIG. 12 is a second alternative embodiment of the hybrid mouse of FIG. 1.

In FIG. 12, a conventional trackball 96 is mounted at the top of the housing among control buttons 102, 104 and 106. A roller 98, for signaling z-axis motion, is mounted at the side of housing 108. In the preferred embodiment herein, there are two position detectors 110 and 112 for conventional x-y and yaw position sensing. With only one detector, detection of yaw is not possible, but the present invention may still be used. Trackball 96, being a conventional two-dimensional cursor control device, will supply information relative to two additional degrees of freedom beyond that supplied by roller 98. An early version of a trackball is disclosed in U.S. Pat. No. 3,541,521 to R. A. Koster. Trackball 96 is positioned in an opening which partially cuts away a portion of control buttons 102, 104 and 106. The purpose is to allow a user to manipulate the trackball as well as the control buttons. The position of roller 98 is such that a thumb of a user on the housing 108 can operate the roller.

With reference to FIG. 13, a hybrid mouse is shown similar to that of FIG. 12, except that no roller is present. This embodiment employs a dual detector mouse with optical sensors 110 and 112 together with control buttons 102, 104 and 106. Trackball 96 is positioned in the same manner as in the previous embodiment. Output signals are the same, except there is no z-axis signal. The signals present would be the x,y and yaw signals produced in a conventional manner by the mouse 114 together with the pitch and roll signals produced by the trackball 96. The trackball is supported completely within the mouse housing and does not contact the surface which the mouse contacts. It is possible to mount more than one trackball in the mouse housing if the size of the housing is expanded. Each additional trackball would add two additional degrees of freedom. In this application, a "hybrid" mouse describes either a dual detector mouse or a conventional single detector mouse combined with a z-axis roller or a trackball or both the roller and the trackball.

We claim:

1. A multidimensional pointing device for use with a computer comprising, mouse means for sensing x motion and y motion relative to a planar surface, the mouse means including at least one actuatable signalling button and having means for producing x and y electrical signals in response to said motion and means for producing a control signal in response to actuation of the signalling button, a first finger actuated means mounted on the mouse for indicating z motion, with means for producing a z motion signal in response to said indication, and output means for delivering said x, y and z motion signals, a second finger actuated means proximate to the first finger actuated means for indicating roll motion, with means for producing a roll motion signal in response to said indication, a third finger actuated means proximate to the first finger actuated means for indicating pitch motion, with means for producing a pitch motion signal in response to said indication, wherein said second and third finger actuated means are switches operable in combination with said first finger actuated means, the closure of one of said switches in combination with actuation of the first finger actuated means indicating pitch or roll said output means for delivering said x, y and z motion signals also delivering said pitch and roll motion signals.

2. A multidimensional pointing device for use with a computer comprising, mouse means for sensing x motion and y motion relative to a planar surface, the mouse means including at least one actuatable signalling button and having means for producing x and y electrical signals in response to said motion and means for producing a control signal in response to actuation of the signalling button, a first finger actuated roller means mounted on the mouse for indicating z motion by turning of the roller, with means for producing a z motion signal in response to said indication, a second and third finger actuated means proximate to the first finger actuated means for indicating roll and pitch motion, with means for producing respective roll and pitch motion signals in response to said indication, wherein said second and third finger actuated means are switches operable in combination with said roller means, the operation of one of said switches in combination with the turning of the roller indicating pitch or roll, and output means for delivering said x, y, z, pitch and roll motion signals.

3. A multidimensional pointing device for use with a computer comprising, mouse means for sensing x motion and y motion relative to a planar surface, the mouse means including at least one actuatable signalling button and having means for producing x and y electrical signals in response to said motion and means for producing a control signal in response to actuation of the signalling button, a roller means mounted on the mouse for indicating an extent of motion in combination with a switch, a first finger actuated switch mounted on the mouse for indicating roll motion, the extent of roll motion indicated by turning of the roller means, a second finger actuated switch mounted on the mouse for indicating pitch motion, the extent of pitch motion indicated by turning of the roller means, and means for producing electrical pitch or roll signals in response to actuation of said first or second finger actuated switches and turnings of said roller means.

4. The apparatus of claim 3 further defined by a bidirectional tilting suspension mounting said roller means, said first and second switches actuated by tilting said suspension in one direction or the other.

5. The apparatus of claim 3 wherein turning of said roller means indicates z motion when neither the first nor second switches is actuated, said apparatus having means for producing z electrical signals in response to turning of the roller means.

* * * * *

UNITED STATES PATENT AND TRADEMARK OFFICE
CERTIFICATE OF CORRECTION

PATENT NO. : 5,446,481
DATED : August 29, 1995
INVENTOR(S) : William G. Gillick

It is certified that error appears in the above-indentified patent and that said Letters Patent is hereby corrected as shown below:

Column 5, line 66, "We claim:" should read --I claim--.

Signed and Sealed this

Sixteenth Day of January, 1996

Attest:

BRUCE LEHMAN

Attesting Officer         Commissioner of Patents and Trademarks